July 15, 1958    J. SOUTHWORTH, JR., ET AL    2,843,651
COVER SEAL
Filed Sept. 28, 1956

INVENTORS
JAMES SOUTHWORTH, JR.
HARRY W. HOLLAND
JOHN P. BADGER

BY Herbert J. Evers
ATTORNEY

United States Patent Office 2,843,651
Patented July 15, 1958

2,843,651

COVER SEAL

James Southworth, Jr., and Harry W. Holland, Rocky River, and John P. Badger, Elmore, Ohio, assignors to Union Carbide Corporation, a corporation of New York Application September 28, 1956, Serial No. 612,655

5 Claims. (Cl. 136—133)

This invention relates to a sealing and retaining means, and more particularly concerns a cover seal for sealing a battery against escape of corrosive electrolyte.

In accordance with this invention, an improved seal fitting is provided in a cover assembly for a storage battery or primary cell, for example, an air depolarized cell. It has been common practice in the manufacture of industrial type air depolarized cells employing a caustic electrolyte, such as potassium hydroxide, to effect a seal between the battery case and the cover by pouring a molten compound such as asphalt into the clearance space therebetween.

The difficulty in the commercial manufacture of this type of seal is that there is no reliable method of obtaining an adequate seal to prevent creepage of electrolyte. Usually oil is poured onto the surface of the electrolyte, but this may contact the electrical leads, and produce poor electrical contacts. Sometimes molten asphalt is applied as a cover seal in layers, and the surface of each layer is heated before the application of the next succeeding layer. This improves the wetting characteristics in the vicinity of the seal, and improves the chances for obtaining a proper seal. Even then, there may still be imperceptible flaws in the asphalt seal through which electrolyte, particularly an alkaline electrolyte, may pass. In addition, because of the tendency for the asphalt to run and smear, there is no uniformity or control in the appearance of the finished battery assembly. As a consequence, the present day sealing methods are costly and time consuming.

It is, therefore, an important object of the present invention to provide improved and reliable means for joining a cover and casing together and maintaining sealing relation therebetween.

Another object of the present invention is to provide a simple and inexpensive method for sealing a caustic electrolyte inside a battery casing.

Other objects, features and advantages of the present invention will be apparent from the following detailed description of certain embodiments thereof taken in conjunction with the accompanying drawings in which.

Figure 1:
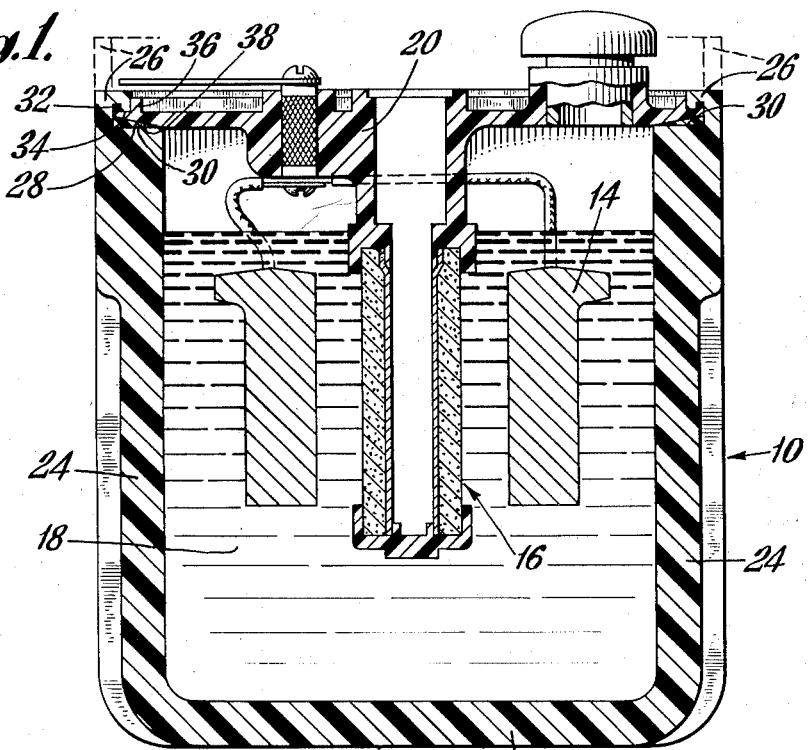
Fig. 1 is a front elevational view, in section, of a battery assembly illustrating the principles of the present invention.

As shown in the drawings, an air depolarized cell 10 embodying features of the present invention may comprise an impervious composition battery casing 12, having therein a pair of anodes 14, such as amalgamated zinc, straddling a cathode unit 16, and an electrolyte solution 18, such as sodium or potassium hydroxide therebetween.

The cathode unit 16 includes a plastic frame 20, which functions as a closure or cover member for the cell 10.

The cell casing 12 is composed of a rigid asphaltic compound or other suitable thermoplastic material which is resistant to the action of the electrolyte material 18, and comprises a bottom wall 22 and side walls 24 integrally formed therewith.

According to the present invention, means are provided for sealing the cover 20 against escape of corrosive electrolyte. To this end, each of the walls 24 is provided with a terminal flange 26, which is stepped from the wall to define a ledge or shoulder 30 for receiving thereon the cover assembly 20.

For sealing purposes, the cover 20 is provided at each of its edges with a short terminal flange or collar 32. Adjacent each of the collars 32 is a recess or groove 34, which merges with an inner flange 36, which projects slightly beyond the collar 32.

Disposed between the cover 20 and the casing shoulder 30 is a sealing gasket 28 made of a flowable, plastic compound such as asphalt.

Figure 2:
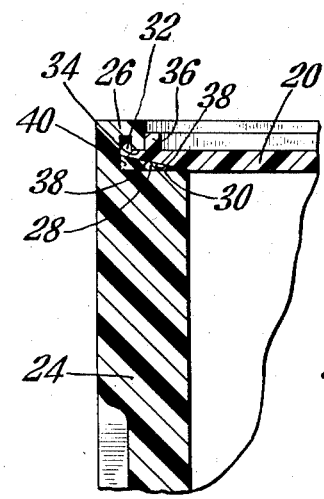
Fig. 2 is an enlarged sectional elevation view of the cover seal in the battery assembly shown in Fig. 1.
Figure 3:
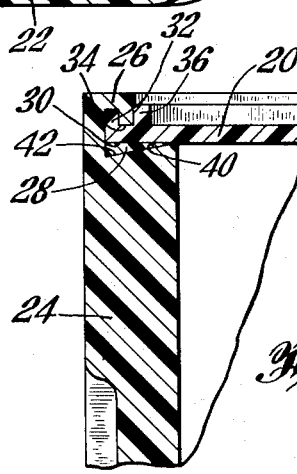
Fig. 3 is a view similar to Fig. 2, but showing a modification thereof.

In the embodiment of the invention shown in Fig. 2, a beveled edge 38 in the cover 20 defines a gasket or sealing space 40 for the reception of the sealing gasket 28. Alternatively, in the modification shown in Fig. 3, an undercut portion 42 may be provided in the casing shoulder 30 to allow room for receiving the sealing gasket 28.

In accordance with the invention, an effective seal between the cover 20 and the casing wall 24 is provided by softening the casing flange 26, as by heating, and in turning it from the dotted outline position shown in Fig. 1 against the cover 20, where it is adapted to conformably and snugly seat in the cover groove 34 and against the cover collar 36. As the casing flange cools, it shrinks into interlocking engagement with the cover 20, and squeezes and compresses the sealing gasket 28 in the manner indicated in Fig. 1. At the same time, the casing flange 26 forms a mechanical lock around the cover edges for permanently retaining the cover 20 in sealing position.

It will be understood that modifications and variations may be effected without departing from the spirit and scope of the present invention.

What is claimed is:

1. A sealing assembly according to claim 4, each of said shoulders having an undercut portion defining a gasket space for the reception of said sealing gasket therein.

2. A sealing assembly according to claim 4, each of said cover edges having a beveled surface adjacent its associated shoulder and defining a gasket space therewith for the reception of said sealing gasket therein.

3. A method of effecting a cover seal for a plastic casing comprising forming an upstanding flange at the rim of said casing, providing a shoulder in said casing at the base of said flange, inserting a sealing gasket of a flowable, semi-plastic material on said shoulder, supporting over said shoulder and said seal a cover having an upstanding terminal collar flange, heating said casing flange, inwardly bending said casing flange in overlapping and conformable engagement with said cover collar, and allowing said casing flange to cool and shrink, thereby forming a mechanical lock for said cover squeezing said sealing gasket into sealing position.

4. In a battery, a fluid seal assembly comprising a casing of thermoplastic material provided with a bottom wall and side walls therefor, each of said side walls having an inner shoulder, a cover for said casing fitting in said casing side walls in supporting relation to said shoulders, and a flowable semi-plastic sealing gasket between said cover and said shoulders, said cover having an upstanding collar at each edge thereof, and held in place compressibly on said shoulder by an overbearing flange of said side walls, said flange having thereon a collar section adaptable to closely mate with said cover, whereby said plastic sealing gasket cover and shoulder form a sealing assembly.

5. In a battery, a fluid seal assembly comprising a casing of thermoplastic material provided with a bottom wall and circular side wall therefor, said circular side wall having an inner circumferential shoulder, a cover for said casing fitting within said circular side wall in supporting relation to said circumferential shoulder, and a flowable semi-plastic sealing gasket between said cover and said shoulder, said cover having a pair of adjacent upstanding circumferential collars defining a groove therebetween, said cover held compressively in place on said shoulder by an overbearing flange of said side wall, said flange having thereon a collar section adaptable to closely mate with said groove between said adjacent collars, whereby said plastic sealing gasket, cover and shoulder form a sealing assembly.

References Cited in the file of this patent
UNITED STATES PATENTS

| | | |
|---|---|---|
| 1,468,051 | Thompson | Sept. 18, 1923 |
| 1,983,611 | Jackson | Dec. 11, 1934 |
| 2,396,693 | Glover | Mar. 19, 1946 |